US007708199B2

(12) United States Patent
Gatto (10) Patent No.: US 7,708,199 B2
(45) Date of Patent: *May 4, 2010

(54) ELECTRONIC FUND TRANSFER OR TRANSACTION SYSTEM

(76) Inventor: James G. Gatto, 1101 Mountain Hope Ct., Great Falls, VA (US) 22066

( * ) Notice: Subject to any disclaimer, the term of this patent is extended or adjusted under 35 U.S.C. 154(b) by 1393 days.

This patent is subject to a terminal disclaimer.

(21) Appl. No.: 10/623,656

(22) Filed: Jul. 22, 2003

(65) Prior Publication Data

US 2005/0173519 A1 Aug. 11, 2005

Related U.S. Application Data

(60) Continuation of application No. 10/237,933, filed on Sep. 10, 2002, now Pat. No. 6,796,492, which is a continuation of application No. 09/922,935, filed on Aug. 7, 2001, now Pat. No. 7,661,590, which is a continuation of application No. 09/658,622, filed on Sep. 8, 2000, now abandoned, which is a division of application No. 08/670,599, filed on Jun. 26, 1996, now Pat. No. 6,149,055, which is a continuation-in-part of application No. 08/421,486, filed on Apr. 13, 1995, now Pat. No. 5,546,523.

(51) Int. Cl.
*G06F 7/08* (2006.01)
(52) U.S. Cl. .......................... 235/381; 235/379; 235/384
(58) Field of Classification Search ..................... 705/16, 705/26, 30, 35, 36; 235/379, 375, 384, 381
See application file for complete search history.

(56) References Cited

U.S. PATENT DOCUMENTS 3,184,714 A 5/1965 Brown, Jr. et al. .......... 340/149

(Continued)

FOREIGN PATENT DOCUMENTS

EP 0 014 312 A2 8/1980

(Continued)

OTHER PUBLICATIONS

"Smart Cards: NCR & AT&T Announce New Smart Cards ATM Technology", *Edge*, Dec. 11, 1992, 2 pages.

*Primary Examiner*—Karl D. Frech
(74) *Attorney, Agent, or Firm*—Fitch, Even, Tabin & Flannery (57) ABSTRACT

An electronic fund transfer (EFT) system capable of displaying a menu including one or more user-defined custom transactions associated with an identification card so that the user can select a desired transaction by a single selection or with limited inputs. The transactions may be defined by a user during a set-up/authorization operation and/or may be stored based on transactions performed by the user. Additionally, the transactions may be stored on the identification card, in a local memory of a transaction terminal and/or in a system memory of the EFT system. A single identification card may be used to enable the user to select from a plurality of financial accounts with different institutions. Another asset of an ATM system and method comprises a graphical user interface that enables a user to select a transaction type and the transaction parameters necessary to define that transaction from a single display. By use of a pointing device (and possibly other input devices), the user can select or change selections for the transaction type and/or transaction parameters. Preferably, the display is created using object-oriented programming and has a plurality of objects corresponding to the transaction type and transaction parameters. Using the pointing device, the user selects the transaction type. Once the transaction type is selected, the transaction parameters necessary to define the selected transaction type are selected. The ATM system may preselect transaction types and/or transaction parameters based on stored information relating to the user (such as a previous transaction or other information). If the selections are as the user desires them to be for the desired transaction, then the user can simply click on a command button (e.g. a button labeled "OK") to cause the transaction to be executed. This potentially reduces the number of inputs or selections that a user must make to execute a desire transaction.

27 Claims, 6 Drawing Sheets

U.S. PATENT DOCUMENTS

| | | | |
|---|---|---|---|
| 3,655,947 A | 4/1972 | Yamamoto et al. | 235/61.7 B |
| 3,778,595 A | 12/1973 | Hatanaka et al. | 235/31.7 B |
| 3,786,421 A | 1/1974 | Wostl et al. | 340/149 A |
| 3,931,497 A | 1/1976 | Gentile et al. | 235/61.7 B |
| 4,197,986 A | 4/1980 | Nagata | 235/379 |
| 4,225,779 A | 9/1980 | Sano et al. | 235/379 |
| 4,314,352 A | 2/1982 | Fought | 364/900 |
| 4,319,336 A | 3/1982 | Anderson et al. | 364/900 |
| 4,359,631 A | 11/1982 | Lockwood et al. | 235/381 |
| 4,360,728 A | 11/1982 | Drexler | 235/462 |
| 4,460,960 A | 7/1984 | Anderson et al. | 364/200 |
| 4,484,304 A | 11/1984 | Anderson et al. | 364/900 |
| 4,511,970 A | 4/1985 | Okano et al. | 364/401 |
| 4,525,779 A | 6/1985 | Davids et al. | 364/200 |
| 4,593,183 A | 6/1986 | Fukatsu | 235/379 |
| 4,608,485 A | 8/1986 | Miura | 235/379 |
| 4,650,977 A | 3/1987 | Couch | 235/379 |
| 4,660,168 A | 4/1987 | Grant et al. | 364/900 |
| 4,727,243 A | 2/1988 | Savar | 235/379 |
| 4,736,094 A | 4/1988 | Yoshida | 235/379 |
| 4,900,903 A | 2/1990 | Wright et al. | 235/380 |
| 4,900,906 A | 2/1990 | Pusic | 235/381 |
| 4,959,788 A | 9/1990 | Nagata et al. | 364/408 |
| 4,967,366 A | 10/1990 | Kaehler | 364/479 |
| 5,010,238 A | 4/1991 | Kadono et al. | 235/379 |
| 5,034,916 A | 7/1991 | Ordish | 364/900 |
| 5,047,613 A | 9/1991 | Swegen et al. | 235/379 |
| 5,132,521 A | 7/1992 | Smith et al. | 235/382 |
| 5,140,517 A | 8/1992 | Nagata et al. | 364/408 |
| 5,144,115 A | 9/1992 | Yoshida | 235/379 |
| 5,175,416 A | 12/1992 | Mansvelt et al. | 235/379 |
| 5,202,549 A | 4/1993 | Decker et al. | 235/379 |
| 5,265,033 A | 11/1993 | Vajk et al. | 364/514 |
| 5,276,314 A | 1/1994 | Martino et al. | 235/379 |
| 5,327,066 A | 7/1994 | Smith | 320/2 |
| 5,340,969 A | 8/1994 | Cox | 235/381 |
| 5,343,906 A | 9/1994 | Tibbals, III | 141/83 |
| 5,365,516 A | 11/1994 | Jandrell | 370/18 |
| 5,389,773 A | 2/1995 | Coutts et al. | 235/379 |
| 5,408,417 A | 4/1995 | Wilder | 364/479 |
| 5,424,938 A | 6/1995 | Wagner et al. | 364/408 |
| 5,434,395 A | 7/1995 | Storck et al. | 235/380 |
| 5,484,988 A | 1/1996 | Hills et al. | 235/379 |
| 5,493,315 A | 2/1996 | Atchley | 345/200 |
| 5,496,992 A | 3/1996 | Madan et al. | 235/462 |
| 5,521,363 A | 5/1996 | Tannenbaum | 235/379 |
| 5,525,081 A | 6/1996 | Mardesich et al. | 440/6 |
| 5,526,357 A | 6/1996 | Jandrell | 370/95.2 |
| 5,546,523 A * | 8/1996 | Gatto | 345/811 |
| 5,613,012 A | 3/1997 | Hoffman et al. | 382/115 |
| 5,615,277 A | 3/1997 | Hoffman | 382/115 |
| 5,664,110 A | 9/1997 | Green et al. | 705/26 |
| 5,705,798 A | 1/1998 | Tarbox | 235/379 |
| 5,710,887 A | 1/1998 | Chelliah et al. | 395/226 |
| 5,725,124 A | 3/1998 | Bustos et al. | 221/211 |
| 5,737,439 A | 4/1998 | Lapsley et al. | 382/115 |
| 5,764,789 A | 6/1998 | Pare, Jr. et al. | 382/115 |
| 5,802,199 A | 9/1998 | Pare, Jr. et al. | 382/115 |
| 5,805,719 A | 9/1998 | Pare, Jr. et al. | 382/115 |
| 5,838,812 A | 11/1998 | Pare, Jr. et al. | 382/115 |
| 5,859,416 A * | 1/1999 | Gatto | 235/384 |
| 5,982,914 A | 11/1999 | Lee et al. | 382/124 |
| 6,012,039 A | 1/2000 | Hoffman et al. | 705/14 |
| 6,045,039 A | 4/2000 | Stinson et al. | 235/379 |
| D425,873 S | 5/2000 | Anderson et al. | D14/100 |
| 6,073,124 A | 6/2000 | Krishnan et al. | 705/59 |
| 6,098,879 A | 8/2000 | Terranova | 235/384 |
| 6,131,464 A | 10/2000 | Pare, Jr. et al. | 73/714 |
| 6,149,055 A * | 11/2000 | Gatto | 235/379 |
| 6,150,921 A | 11/2000 | Werb et al. | 340/10.1 |
| 6,154,879 A | 11/2000 | Pare, Jr. et al. | 902/3 |
| 6,192,142 B1 | 2/2001 | Pare, Jr. et al. | 382/115 |
| 6,230,148 B1 | 5/2001 | Pare, Jr. et al. | 705/40 |
| 6,269,348 B1 | 7/2001 | Pare, Jr. et al. | 705/39 |
| 6,286,756 B1 | 9/2001 | Stinson et al. | 235/379 |
| 6,308,428 B1 | 10/2001 | Creighton, III | 33/286 |
| 6,366,682 B1 | 4/2002 | Hoffman et al. | 382/115 |
| 6,397,198 B1 | 5/2002 | Hoffman et al. | 705/44 |
| 6,411,728 B1 | 6/2002 | Lee et al. | 382/125 |
| 6,422,464 B1 | 7/2002 | Terranova | 235/384 |
| 6,460,036 B1 | 10/2002 | Herz | 707/10 |
| 6,571,279 B1 | 5/2003 | Herz et al. | 709/217 |
| 6,581,042 B2 | 6/2003 | Pare, Jr. et al. | 705/40 |

FOREIGN PATENT DOCUMENTS

| | | |
|---|---|---|
| EP | 0 157 416 A2 | 10/1985 |
| EP | 0 162 221 A2 | 11/1985 |
| EP | 0 717 381 A1 | 6/1996 |

* cited by examiner

| # | Transaction Type | Account (From) | Account (To) | Amount | Receipt |
|---|---|---|---|---|---|
| 1 | Withdrawal | Checking | ------- | $200 | Y |
| 2 | Withdrawal | Savings | ------- | $100 | Y |
| 3 | Deposit | ------- | Checking | $2,500 | Y |
| 4 | Deposit | ------- | Savings | $2,500 | Y |
| 5 | Transfer | Savings | Checking | $1,000 | Y |
| 6 | Transfer | Savings | Checking | $2,000 | Y |
| 7 | | | | | |
| 8 | | | | | |
| 9 | | | | | |
| 10 | | | | | |

ELECTRONIC FUND TRANSFER OR TRANSACTION SYSTEM

CROSS REFERENCE TO RELATED APPLICATION

This application is a continuation of copending U.S. patent application Ser. No. 10/237,933, filed Sep. 10, 2002 now U.S. Pat. No. 6,796,492, which is a continuation of U.S. patent application Ser. No. 09/922,935, filed Aug. 7, 2001 now U.S. Pat. No. 7,661,590, which is a continuation of U.S. patent application Ser. No. 09/658,622, filed Sep. 8, 2000, now abandoned, which is a divisional of U.S. patent application Ser. No. 08/670,599, filed Jun. 26, 1996, now U.S. Pat. No. 6,149,055, which is a continuation-in-part of U.S. patent application Ser. No. 08/421,486 filed Apr. 13, 1995, now U.S. Pat. No. 5,546,523.

FIELD OF THE INVENTION

The invention relates generally to electronic transaction network systems and more particularly to electronic fund transfer systems such as automated teller machines. Specifically, one aspect of the invention relates to publicly accessible automated teller machine systems and methods and more specifically relates to an improved user interface for the selection of transactions and transaction parameters for use therein.

BACKGROUND OF THE INVENTION

Electronic fund transfer (EFT) systems in general are well known. One example of an EFT system is an automated teller machine (ATM). An example of an ATM is shown, for example, in U.S. Pat. Nos. 4,319,336 (the "'336 Patent") and 4,484,304, issued to Anderson et al. The general operation of publicly available ATMs is well known. Briefly, however, ATMs typically operate by a user inserting an ATM or other type of identification card into an ATM machine, entering a personal identification number (PIN), selecting an account (checking, savings, etc.), selecting a type of transaction or function (withdrawal, deposit, transfer, payment, balance inquiry, etc.) and using individual numeric keys of a keypad to select the dollar (and cents) amount for the transaction. In some cases, the user also selects the language for the display (English, Spanish, etc.).

Since several types of transactions may be performed such as withdrawals, deposits, transfers, payments and inquiries, a user is typically first presented with a screen that displays a menu of a plurality of transaction types (e.g., withdrawal, deposit, transfer, payment, balance inquiry, etc.). The user may then select a desired transaction type by entering an input corresponding to a list of available transaction types displayed on a menu screen. The user next selects the various transaction parameters necessary to define the selected transaction type by entering inputs corresponding to choices displayed on several consecutive menu screens, each of which relates to one of the transaction parameters. For example, once the user selects the desired transaction type, then another menu screen is displayed showing a list of choices corresponding to one of the transaction parameters necessary to define the selected transaction type. Assume, for example, that a user selects "Withdrawal" as the transaction type. The next menu screen displayed may ask for the account from which the Withdrawal is desired (e.g., savings, checking, credit card, etc.). Once the user selects the appropriate account, another menu screen is displayed prompting the user to choose another transaction parameter (e.g., the amount to be withdrawn). Once the user selects an amount, another menu screen is commonly displayed asking whether the displayed amount is correct and the user selects OK if it is correct and NO (or a similar input) if it is not correct. If the user indicates that the amount is correct, then another menu screen is commonly displayed asking whether the user desires a receipt of the transaction to be printed. The user selects Yes or No. Other screens corresponding to additional transaction parameters may also be displayed. Once all of the transaction parameters have been entered, the transaction is executed, in a known manner.

The need to manually enter or select the transaction type and each or many of the transaction parameters each time a user desires to perform a transaction can be annoying and time consuming. This is especially true for individuals who routinely perform transactions with the same or similar parameters. Additionally, typically only one choice (e.g., a transaction type or one of the transaction parameters) is made per menu screen. This is inefficient.

While certain ATMs enable a user to automatically select an amount (sometimes referred to as a "Fast Cash" amount) rather than entering the amount manually using the numbers of a keypad, a limited number of Fast Cash choices are available. Also, these choices are globally programmed in a system so that each user typically has the same limited choices. Moreover, even with a Fast Cash feature, the user still often needs to select certain transaction parameters such as an account (e.g., savings or checking) and a function or transaction type (e.g., withdraw cash). Only then are different dollar amounts displayed from which the user can choose. While this eliminates the need to enter specific dollar amounts, it still involves selection of several transaction parameters or entries by a user. Moreover, typically only one choice per screen is made. These are undesirable drawbacks.

EFT systems also include point-of-sale terminals and a number of other systems. Point-of-Sale (POS) or point of interaction terminals (collectively referred to herein as "POS terminals") are used for example at grocery checkouts, gas station pumps and other retail locations to enable a user to pay for a purchase by using an ATM card, a credit card, a debit card or other similar methods. POS terminals also typically require a number of user inputs and transaction parameters to effect a transaction.

Another problem that arises in using some EFT systems (e.g., ATM or POS terminals) is the need for separate user identification cards for each "account" or institution with which a user has a financial relationship. Examples of such well known cards include bank ATM cards, American Express cards, MasterCard and Visa Cards, department store credit cards, gas company credit cards and air travel cards, to name but a few. Thus, many people typically carry one or more identification cards. This is inconvenient. Other drawbacks and disadvantages of the prior art also exist.

SUMMARY OF THE INVENTION

It is an object of the present invention to overcome these and other drawbacks of the prior art.

It is another object of the present invention to provide an EFT system with a transaction menu customized for an individual user or account.

It is another object of the invention to enable user-defined transactions to be completed with a reduced number of inputs from the user at the time the transaction is executed.

It is another object of the invention to provide an EFT system which facilitates the selection of a greater number of menu choices.

It is a further object of the invention to provide a single user identification card for use with an EFT system that enables a user to perform transactions involving a selected one or selected ones of the users accounts and/or selected financial institution(s) with which the user has a financial relationship.

It is another object of the invention to provide an ATM system with a single display screen from which a user can select a transaction type and one or more of the transaction parameters necessary to define the selected transaction.

It is another object of the invention to provide an ATM system with a pointing device and a display screen from which a user can select a transaction type and/or one or more of the transaction parameters necessary to define the selected transaction by using the pointing device.

It is another object of the invention to provide an ATM system and method that predicts and automatically preselects a transaction type for an ATM transaction (e.g., based on a user's prior transactions) and enables a user to confirm or change the preselection prior to execution of the transaction.

It is another object of the invention to provide an ATM system and method that predicts and automatically preselects transaction parameter(s) for an ATM transaction (e.g., based on a user's prior transactions) and enables a user to confirm or change the preselections prior to execution of the transaction.

It is another object of the invention to provide an ATM system and method that provide one or more lists of transactions from which a user can select to execute an ATM transaction, where the list(s) preferably is (are) based on the user's prior transactions.

It is another object of the invention to provide an ATM system and method that provides, for a selected transaction type, a list of transaction parameters from which a user can select to execute an ATM transaction, where the list(s) preferably is (are) based on the user's prior transactions.

To accomplish these and other objects of the present invention, according to one embodiment of the present invention, an EFT system comprises an identification (ID) card, at least one central control unit connected to a plurality of transaction terminals, where each terminal preferably comprises a display, an ID card reader/writer, at least one user input device and a local controller. According to one aspect of the invention, the EFT system is operable to enable various transaction parameters for different transactions to be predefined by a user and stored before it is desired to effect a transaction, so that when it is desired to effect a transaction, the controller can cause an individually customized menu to be displayed for each user to enable the user to select a user predefined transaction with a reduced number of entries by the user at the time of execution of the transaction.

According to one embodiment, one way to accomplish this is to store one or more customized user-defined transactions on a magnetic medium of the user ID card so that once a user inserts the ID card into a card reader at the terminal and enters valid verification data (e.g., a PIN), a menu containing choices corresponding to one or more of the user-defined transactions is displayed. Preferably, these transactions may be selected by touching a single key of a keypad, by touching an area of the display (e.g., if a touch sensitive screen is used), by touching a single key adjacent the menu entry, by using a "point-and-click" device or by other input methods. The user-defined transactions may be stored on the ID card upon activation, added by a user at a terminal or automatically stored based on the users recent transactions. Alternatively, these transactions may be stored on the EFT system (for example in a memory associated with a local controller of one or more terminals or in a central memory associated with one or more central controllers) and recalled at the time a user desires to effect a transaction.

According to another embodiment, the user may predefine and store a plurality of transactions involving different financial institutions. To facilitate this, a single ID card may be used to store the information. Thus, one universal card can be used by an individual to enable execution of transactions from or to a plurality of different accounts/institutions.

According to another embodiment of the present invention, an ATM system and method is provided wherein a graphical user interface (GUI) is provided that enables a transaction type and all or some of the transaction parameters necessary (and/or desired) to define that transaction to be simultaneously displayed on one display. According to one embodiment, the GUI preferably comprises a plurality of "objects" commonly used with object-oriented programming (e.g., list boxes, combo boxes, radio buttons, command buttons, check boxes, message boxes, etc.). Each of the user choices may be represented by one of the objects. Preferably, the GUI has one object corresponding to the transaction type. This object may be, for example, a list box or a plurality of radio buttons. Preferably, this object provides a list of types of transactions available for selection. By pointing to and selecting one of the choices, the user specifies the transaction type desired. Once the transaction type is selected, other objects on the GUI may be used to enable the user to select the relevant transaction parameters necessary to define the selected transaction. This may include objects for selecting the account(s) for the transaction, the amount of the transaction and whether a receipt should be printed. Other transaction parameters may also be desired depending on the transaction.

According to another embodiment, the display displays a table having a plurality of rows and columns, where the rows and columns contain a listing of the transactions and all or some of their parameters. For example, a first column may contain a listing of transaction identifiers (e.g. 1, 2, 3 . . . , etc.), a second column may contain a listing of transaction types, third and fourth columns may contain a listing of accounts (e.g., from and to accounts), a fifth column may contain a listing of amounts and a sixth column may contain an indication of whether or not a receipt should be printed. Other types of information may also be displayed and the order of the rows and columns is not necessarily critical. Any logical order may be used. The ATM, in addition to having the structural elements normally found on ATM machines, preferably is provided with a pointing device (e.g., a point-and-click device). The pointing device enables the user to interface with the GUI to review the transaction types and parameters, to select a transaction type and transaction parameters and to change a selected transaction type and/or transaction parameters. It may also be used to confirm these parameters and for other purposes.

According to another aspect of the invention, the ATM may predict and preselect transactions and/or transaction parameters based on stored information associated with the user (such as one or more previous transactions executed by the user or other information). These preselections are then displayed on the display. If the selections are as the user desires them to be for the desired transaction, then the user can simply verify the selections by clicking on a button (e.g., a button labeled "OK") to cause the transaction to be executed. Alternatively, changes may be made, if necessary, to only those parameters that need to be changed. This potentially reduces the number of inputs or selections that a user must make to execute a desire transaction.

According to other features and aspects of the invention, the user identification, transaction definition and/or selection of menu choices may be implemented, in whole or in part, by voice recognition. User identification may also be implemented, in whole or in part, by fingerprint verification, eye scanning or other physical characteristics of the user. Selection of transaction information or menu choices may be implemented by a point-and-click device.

Other embodiments, features and objects of the invention will be readily apparent in view of the detailed description of the invention presented below.

DETAILED DESCRIPTION OF THE PREFERRED EMBODIMENTS

Except as otherwise used in connection with a specific activity, the term "transaction" is intended to broadly describe a wide variety of activities that are or may be performed using an EFT system. By way of example, but without limitation, this includes withdrawing cash, travelers' checks, bonds, and other negotiable instruments or other articles, depositing cash, checks, other negotiable instruments or other articles, transferring funds from one account to another, paying bills, credit card balances or loan payments, cashing checks or other negotiable instruments, obtaining account balance information, paying for the purchase of goods or services, operating gaming devices (e.g., casino games, lottery games) and performing a wide variety of other activities. Typically, the execution of a transaction requires providing user identification information to the system, providing verification information to verify the user is an authorized user, selecting a type of transaction or function, and selecting one or more transaction parameter (e.g., accounts, dollar amounts, etc.) and causing the transaction to be executed.

Figure 1:
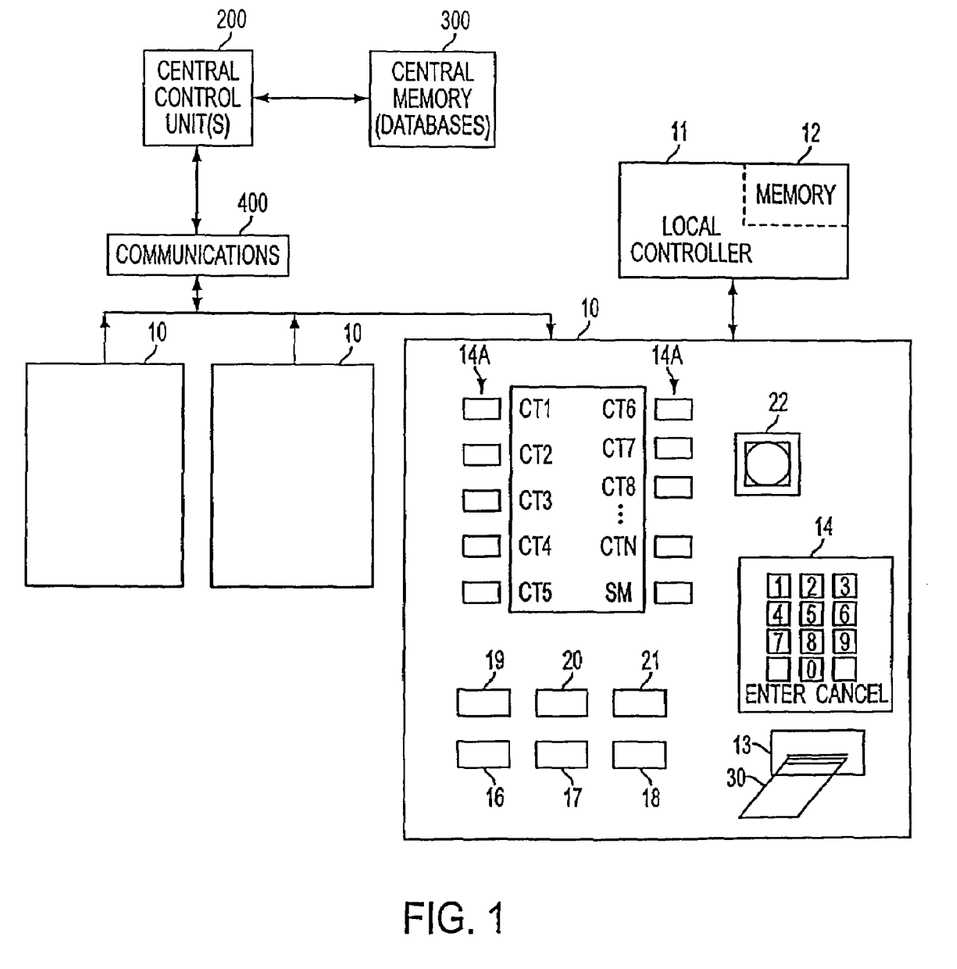
FIG. 1 is a perspective view of an EFT system according to one embodiment of the present invention.

With reference to FIG. 1, there is shown a transaction network system according to one embodiment of the invention. The transaction network system preferably comprises one or more central control units or host processors 200, having associated database(s) or memories 300 and a plurality of transaction terminals 10 connected to one or more of the central control units 200 via communications link 400 in a known manner. An example of one known system and communications link is described in the '336 Patent. Other configurations may be used.

Each terminal 10 preferably comprises or is connected to a local controller 11 that controls the operation of the terminal 10 and a local memory 12 associated with that local controller 11. The general structure and operation of these components in an EFT system, such as an ATM machine, is known.

Each transaction terminal 10 preferably comprises at least one mechanism for identifying a user, for example, a card reader/writer 13. These terminals also comprise one or more input devices, such as a keypad 14 or selection keys 14A located adjacent a display 15. For some applications, such as an ATM, the terminal also preferably comprises one or more of a printer 16, a repository 17, a dispenser 18, a speaker 19, a microphone 20, and a fingerprint identification unit 21. A point-and-click device 22, such as a trackball or other similar device can also be provided to add novel functionality to the ATM as described below.

According to one embodiment, the transaction network system preferably is operable by use of user identification technique such as an identification (ID) card 30 unique to each user or account. Preferably the ID card comprises a plastic card having the ability to store information. As described elsewhere herein, other ID mechanisms may be used. For simplicity, various embodiments of the invention will be described with reference to an ID card having a magnetic strip located thereon. For example, the card may comprise at least one magnetic strip for magnetically storing information. Information may be written to the card 30 and read from the card in a generally known manner.

According to one aspect of the invention, the information stored on the ID card 30 may include one or more financial institution identifiers, one or more account identifiers, authorized user(s) identification information, including for example one or more personal identification numbers, and other desired information that is typically used on an ATM, debit, credit or other similar cards. The ID card 30 may also be used to store transaction information relating to user-defined transactions unique to the user or account. Preferably, the stored information includes transaction identifier information sufficient to identify one or more particular transactions and/or transaction parameters and sufficient information associated with each such identifier to enable a desired transaction to be completed by selecting the transaction identifier, with little or no additional input by the user at the time of execution. The transaction information is preferably individually selected by the card user and stored before executing a transaction to enable transactions to be more easily executed by a user and to enable the same (or similar) transactions to be performed multiple times without the need to re-enter all or most of the transaction parameters each time a user wants to execute a transaction.

The information stored on the card may also include information that enables the controller to determine whether a printed record of an executed transaction should be printed by the printer 16 upon execution of a selected transaction. The information may be stored separately for each transaction or a global selection may be made for all transactions executed with the card. Upon execution of a selected transaction, the controller causes the printer to print a record of the transaction if a printed record is to be printed.

According to one embodiment, the transaction network system comprises an ATM system, wherein the user-defined transactions stored on ID card 30 may be read when a user accesses the ATM to enable the user to easily select a pre-defined transaction for execution. This may be done in a number of ways. Preferably, upon identification and verification of a user, the controller uses the stored transaction information, along with general system information, to cause the display of one or more transaction menus customized for the user. Preferably, the menu includes choices corresponding to one or more of the stored user-defined transactions. Other choices may be provided as discussed below. Preferably, the customized menu also will have a menu choice that enables the user to select a standard menu for that account and/or financial institution (e.g., a menu that enables a user to perform any transaction, not just the stored user-defined transactions, that may be ordinarily performed using the ATM). The term menu is intended to cover a single menu screen or a series of menu screen.

Upon the user's selection of a desired menu choice, the associated transaction is then executed without the need for further inputs or selections by the user or with limited additional inputs or selections, thereby minimizing the number of selections, inputs or entries required by a user to execute a desired transaction.

For example, one transaction that a particular user may often perform is withdrawing $25 from a primary checking account. Therefore, upon insertion of the ID card 30 into the reader/writer 13, information stored on the ID card 30 is read (other preliminary steps may also be performed in a known manner, such as entering a PIN, etc.) and a number of menu choices are displayed on the display 15. The user-customized menu preferably comprises a display of at least some of the user-defined transactions, preferably including custom transactions (or custom transaction identifiers) CT1-CTN and an option to display a standard menu SM. Preferably, there is an alphanumeric (or other) identifier next to each menu item. For example, the first menu choice may be "withdraw $25 from Primary Checking." The number "1" may appear next to this menu choice as a transaction identifier. To execute this transaction the user merely touches the "1" key on the keypad (and optionally hits "ENTER"). This selection is received by the controller 11 which causes the selected transaction to be executed by the terminal and/or EFT system. This minimizes the number of selections/key entries a user must perform to execute a transaction. It also offers greater flexibility than systems which have "Fast Cash" or similar features where every user (or group of users) is offered the same limited transactions and which still usually require the user to select an account and often times a transaction function (e.g., withdraw cash) and an account before the "Fast Cash" choices are displayed.

According to other embodiments, the information stored on the ID card or associated therewith may include information that is read by the card reader to enable the controller to determine whether the user/institution wants the user customized menu to be displayed automatically, not displayed, or displayed as an option from the main menu. If it is determined that the customized menu is to be displayed automatically, then upon entry of the appropriate PIN, the controller causes the customized user menu to be displayed on the display. If it is determined that the customized menu is not to be displayed, then upon entry of the appropriate PIN, the controller causes the standard transaction menu to be displayed (to enable the user to use the normal ATM keys to define and execute a desired transaction). If it is determined that the customized menu is to be displayed as an option on the standard menu, then upon entry of the appropriate PIN, the controller causes the transaction menu to be displayed with the standard transaction menu options (to enable the user to define and execute a desired transaction) and a customized menu option which if selected by the user causes the controller to display the customized menu. According to other embodiments of the invention, the system may store information which determines the particular account, account type or particular institution with which the account is related, and based on prestored information in the system (e.g., at the local and/or central controllers) determines which type of menu is to be displayed to the particular user.

Figure 2:
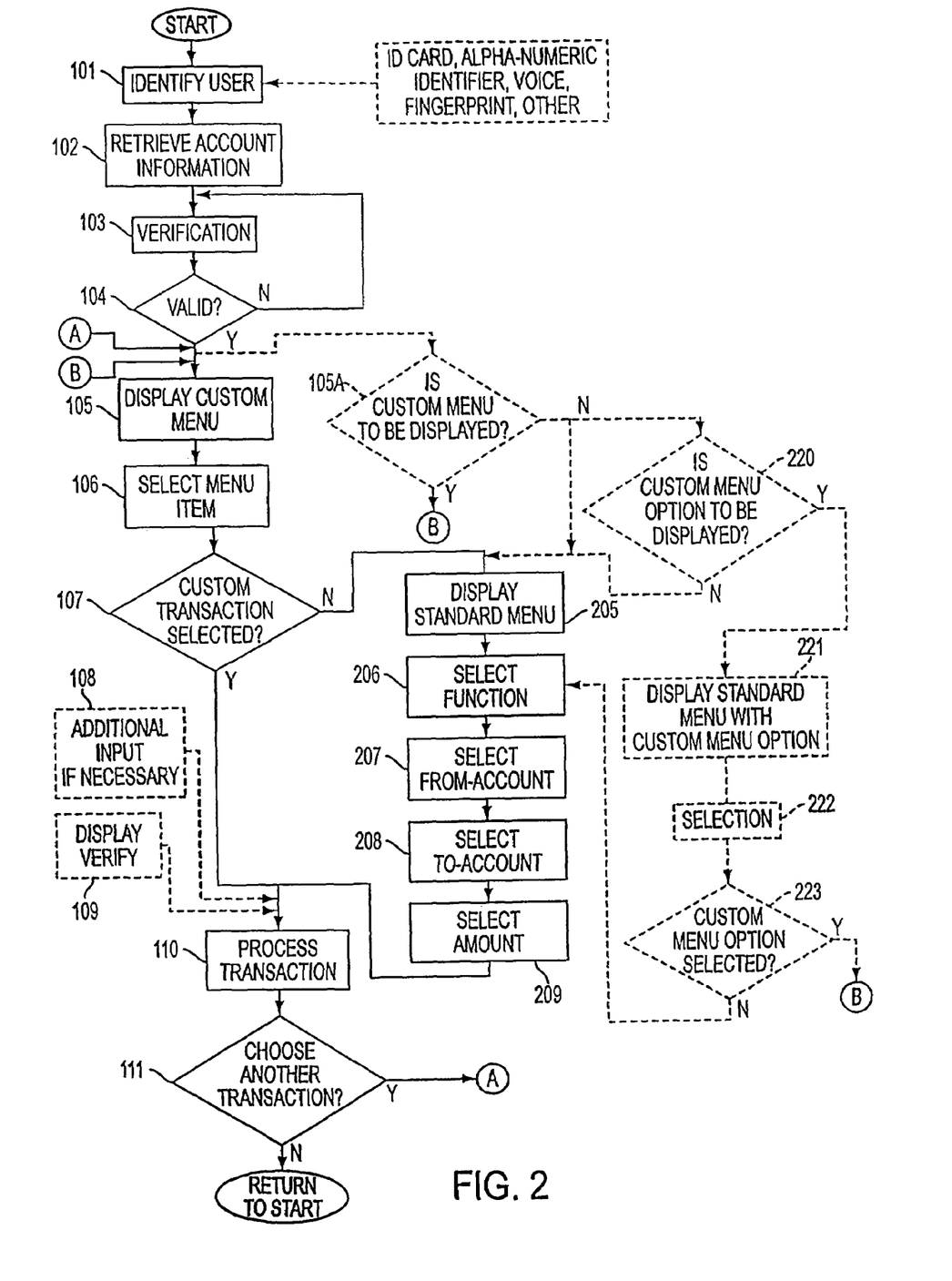
FIG. 2 is a flow chart illustrating operation of the present invention according to one embodiment of the present invention.

FIG. 2 is a flow chart illustrating the operation of preferred embodiments of the present invention. For purposes of this description, it is assumed that a user has already predefined one or more customized transactions and that this information is stored on the user's ID card (or in a memory of the EFT system), for example, during setup of the ID card. Other preliminary steps may also be performed if desired. Furthermore, for simplicity this embodiment will be described in connection with an ATM. However, it is to be understood that this embodiment and other features and embodiments described herein can be used with other types of EFT systems. Moreover, for simplicity, the well known steps associated with the local controller communicating with a central controller are omitted.

In step 101 the user is identified. This may be accomplished in a number of different ways, including by use of an ID card (e.g., ATM card), by entering an alphanumeric identifier using a keypad of the ATM terminal, by voice recognition, fingerprint recognition, by other identification techniques, or a combination of the foregoing. Next, account information associated with the identified user is read (step 102). Preferably, a verification step is performed to verify that the identified user is a valid user (step 103). This may be accomplished by prompting the user to enter a PIN or other identifier (for example, a fingerprint and/or by speaking a certain message) and having the controller determine if the identifier is a valid identifier for the user and/or account (step 104). If it is not, control may return to step 103 for a retry or to step 101 to cancel the improper attempt. If the identifier is valid, control passes to step 105 (or in an alternative embodiment to step 105A, as will be discussed below). Depending on whether all of the necessary information was read in step 102, it may be desirable to read other information from the card (or a memory of the EFT system) after the validation step (step 103).

In step 105, according to one embodiment, the controller causes a custom menu for the user to be displayed. The custom menu preferably comprises choices (e.g. CT1-CTN of FIG. 1) for the user to select one or more transactions predefined by the user. Optionally, one menu item includes a choice for the user to select a "Standard Menu" (e.g. SM of FIG. 1). The Standard Menu preferably corresponds to the types of menu typically used with ATM systems. For example, the Standard Menu may list a number of choices of types of transactions or functions that may be performed (e.g., withdraw cash, deposit cash, transfer funds, balance inquiry, etc.) and prompt the user for other transaction parameters. In step 106, the user selects one of the displayed menu items. As discussed herein, a variety of different mechanisms may be used to select a displayed menu item. In step 107, the controller determines whether the selected menu choice is a request to perform a custom transaction. If the controller determines that a custom transaction was not requested in step 107, then according to one embodiment, a Standard Menu is displayed (step 205). However, other alternatives may be used. If a custom transaction was requested in step 107, the controller causes the selected transaction to be performed (step 110).

Depending on the type of transaction selected, the selected transaction may be performed without further action by the user. If the user defined custom transaction contains all of the necessary information, the controller can cause the transaction to be executed based on the stored information. Alternatively, the display may prompt the user to enter additional information (step 108). For example, if the user predefined transaction specifies a type of transaction and one or more accounts, but not the amount, the user may be prompted to enter the desired amount for the transaction. One advantage of this technique, for example, is where each month a user pays his American Express card balance from his primary checking account. The user could set up a custom transaction that stores information to pay an amount (to be entered) from primary checking to that user's American Express account. Then, all the user needs to do to execute this transaction, is to select this custom transaction and enter the amount for that month. Numerous other examples will be readily apparent.

Also, it may be desirable after selection by the user of a custom transaction (step 107), and/or additional input (step 108) that the controller causes the transaction type and parameters to be displayed with a prompt for the user to verify that this is the desired transaction to be executed (step 109). If the transaction type and parameters are as desired, the user may verify this by one of the input techniques described herein or other input techniques. Preferably, the display produced in step 109 may also give the user options to cancel the transaction, edit the parameters thereof, reselect a transaction or other desired options.

After the desired transaction is processed (step 110), the controller preferably causes the display to display the option for the user to select another transaction or to finish the session. In step 111, if the controller determines that the user desires another transaction, control returns to the point after step 104. If not, control returns to Start.

Returning to step 205, in response to a Standard Menu being displayed, the user is prompted to select a function or transaction (step 206), an account from which the transaction should be processed (step 207), if necessary a "to-account" (step 208) i.e., an account to which the transaction should be processed, for example, if the transaction is a transfer of funds from one account to another, and an amount (step 209). Depending on the type of transaction, other parameters may be selected. Steps 108 and 109 also may be performed if desired. Once all of the necessary transaction information is selected and any verification has occurred, then control passes to step 110 and the transaction is processed. The standard menu may also prompt the user for information in an order different than specified above and/or for different information.

According to another embodiment, after the validation procedure is performed (step 104), control passes to step 105A. According to one embodiment, step 105A causes a user prompt to be displayed which asks the user if the custom menu is to be displayed or whether a Standard Menu should be displayed. If the user selects the custom menu to be displayed, control passes to step 105. If not, according to one embodiment, the Standard Menu is displayed (step 205). According to another embodiment, the user may be prompted to indicate whether a menu (similar to the Standard Menu) should be displayed with one of the menu options being the choice of having the custom menu displayed. In step 220, the controller determines whether the custom menu option is selected. If not, then the Standard Menu is displayed (step 205). If yes, control passes to step 221 whereby a standard menu with a custom menu display option is displayed. After selection of a menu choice by a user (step 222), the controller determines if the custom menu option is selected (step 223). If yes, a custom menu is displayed (step 105). If not, the user selects a function from the Standard Menu (step 206). Alternatively, instead of the user selecting whether a particular menu should be displayed, this information may be determined by the EFT system or ATM terminal. For example, for some ATM terminals, it may be decided as a system choice that one or another menu will be displayed. Alternatively, the choice of menu may be dictated by the particular user (based on certain user information) or the type of account determined in step 102, or by the financial institution with which the account is held. For example, some financial institutions may choose that a particular menu will be displayed. Alternatively, the menu to be displayed may be pre-selected by the user and information corresponding to the selected menu can be stored on the user's ID card, in one or more local memories of one or more ATM terminals, or in one or more central memories of the EFT system.

Consistent with the foregoing, instead of or in addition to storing user-defined transaction information on the ID card, such information may be stored in the local memory of one or more terminals or in a central memory or memories of the system. Storage of such information in a local memory may be particularly useful where a user frequents a particular terminal such as a local bank ATM or grocery store or where the "terminal" is uniquely associated with a particular user or group of users, such as when the terminal comprises a home computer, a portable terminal or other such equipment.

According to another feature of the present invention, if a user executes a transaction that is not already stored (on the ID card, locally in the terminal or globally in the system), upon completion of the transaction, the card reader/writer may write the transaction information to the card (or local memory of the terminal and/or central memory of the network). If written to the ID card for example, the transaction may be stored as a "Recent Transaction." According to one embodiment of the invention, one or more Recent Transactions options may be displayed on the customized user menu. Alternatively, a menu option may be "Display Recent Transactions." The input mechanism may be designed to facilitate scrolling through recent transactions. For example, up/down keys may be provided. Alternatively, according to one aspect of the invention a point-and-click device (e.g. a trackball) may be used as further described below. The use of a point-and-click device is especially advantageous if it is desired to provide menus with a relatively large number of choices to facilitate scrolling through pages of the memory and pointing to one of the choices. Other advantages of using a point-and-click device also exist.

According to another feature, after the user executes a transaction that is not already stored on the ID card, a prompt may be displayed to ask the user if the transaction should be stored as a transaction to appear on the customized menu. If the user desires to do so, the transaction information may be stored as a new user-defined transaction on the ID card. Alternatively, or in addition to this, the user customized menu may include an option to enable the user to change the stored transactions. This preferably includes the ability to modify or delete an existing stored transaction and the ability to add a new transaction.

The features of the invention may be used in a variety of electronic transaction systems including ATMs, POS terminals (e.g. supermarket or retailer checkouts, gas pumps, etc.), travelers check dispensers, coupon dispensers, gaming devices (e.g., slot machines or other "casino games"), lottery machines, check cashing machines, etc.

By way of example, if used in connection with a POS terminal, the terminal may be connected with a cash register or other device to indicate to the terminal the amount of a transaction. The user-defined transactions may include transactions such as "Pay Amount by ATM" or "Pay Amount by VISA." Other predefined transaction options could include "Pay by ATM and Receive $50 Cash Back" or "Pay by ATM and Receive Cash Back." In this latter example, one or more transaction parameters may be entered by the user at the time of use (e.g., the amount of cash to receive back). At gas pumps, the user may prestore selections such as the type of gas desired (regular, premium, etc.) and whether or not a receipt should be printed upon completion of the transaction.

According to another embodiment of the present invention, the ID card may be used as a "universal" card to avoid the need for a user to carry a number of different ID cards such as ATM cards and/or credit or debit cards. According to this embodiment, information for a plurality of accounts may be stored on a single card. The user customized menu may include transactions for a plurality of different accounts and/or financial institutions. For example, a universal card may have information stored thereon for a user's VISA card(s), American Express card(s), department store card(s), casino card(s), gasoline credit card(s) and one or more bank ATM cards. The card may store information to enable a user to execute one or more transactions with one or more selected institutions with which the user has a relationship or is authorized to transact with. For some institutions, the user may have more than one account. All of the information necessary to enable the user to perform a transaction may be stored on a single card. If this feature is used, the stored transaction information may include the user-defined transaction information identified above along with an identifier of the institution and the desired account for which the transaction should be performed. For example, such a stored transaction may include a transaction to "Take $25 Cash Advance from Visa Card" or "Pay $25 From Bank Checking To Visa."

According to one embodiment, it may be desirable to store only most of the transaction information necessary to execute a transaction. For example, the stored partial transaction may be "Pay Visa From Checking." Then, upon display of this item on the user customized menu and selection of it by a user, the user may be prompted to enter the amount to be paid. This option is generally useful when aspects of a particular transaction may vary but some or all of the transaction is repeated. The institution/account information for this embodiment may be written to the ID card in a known manner and can be formatted in a convenient way. According to this embodiment, the user may insert the ID card into a terminal, and upon verification, a customized menu may be displayed. According to one embodiment, the menu may include options for performing transactions with a number of different institutions/accounts. Alternatively, the user may select an institution and a customized menu for that institution may be displayed as described above. If a universal card is used at a POS terminal, the user customized menu may display the list of institution accounts that the particular user may chose from. Then the user may select the account from the menu that is to be used for the transaction. This offers more flexibility and efficiency than currently used systems. A point-and-click device may be used to scroll through the choices and select an institution.

According to another feature, after a customized menu is displayed and a user selects one of the transaction options from the menu, a more detailed description of the transaction may be displayed to enable the user to verify the desired transaction. For example, the transaction type and transaction parameters may be displayed.

While many of the general systems components for an ATM and their functions are known, various other components may be particularly useful with various aspects of the present invention. For example, the user identification step may be accomplished in a number of ways. For example, the user may be identified by a user identification card unique to each user (or account), by entry of alphanumeric information by a keypad or similar input mechanism, or by physical characteristics of the user, for example, by voice recognition, by fingerprint recognition or a combination of these or other techniques. For example, if a fingerprint (or voice) identification unit is provided at each (or some) terminals, the user may be identified by simply entering an appropriate finger into the fingerprint identification unit (or speaking into the voice identification unit), whereby the unit then reads the input information and compares this read information to previously stored identification information to determine the identify of the user. The stored information may be accumulated in the local memory and/or central memory. To facilitate this, each user may be required to provide the necessary fingerprint (or voice) identification information at the time of activation of an account (or at other convenient times). According to one embodiment, the identification information may be initially stored in a central memory. A potential adversity to this approach however is that with a large number of authorized users, it may take some time to find a match between input identification information and stored information. An alternative is to store such information in a local memory of each terminal through which the user accesses the system, as such accesses occur. This would thus build up a local memory capability for each terminal that the user accesses. The local memories are likely to contain a lower number of user's information. If this approach is used, when the user enters the physical user identification information (e.g. voice or fingerprint), the local memory of the terminal through which the user is accessing the system can be checked first to find a match with prestored information. If a match is found, it is likely to occur in less time than if the central system memory is used to find such a match due to the relative number of individual's information stored in the respective memories. If the user has never used the particular terminal before, then no match will be found in the local memory and upon that determination, the local controller may cause a search of the central memory to occur.

According to another aspect of this embodiment, an institution (e.g. a bank) having multiple terminals may download user identification information to each of its terminals so that the user can rapidly access the system via any of that institution's terminals since the user's identification information (e.g. voice or fingerprint) will be stored locally in each of that institution's terminals.

This or similar identification techniques could avoid the need for a user to carry an identification card. If no card is used, once the user is identified (or before), the user may enter institution information to identify an institution with which the user is identified. This may be accomplished by entering (e.g., via a keypad) an institution identification code, selecting an institution from a menu or group of menus that is displayed based on information stored in the EFT system or by storing such information in the system (locally and/or centrally) in association with user identification. Once the user and account is identified, then verification information may be entered (e.g., a PIN) for the user for the selected institution or account and transactions may be selected as described herein.

According to another embodiment of the invention, a publicly accessible ATM (or other EFT) terminal is provided with a point-and-click device such as a trackball or similar device to facilitate (and enhance) selection and/or input of desired transactions, functions, parameters, menus or other choices. The use of such a pointing device can facilitate a number of other features. For example, with the use of such a device, a user may point to a menu item and click on it to select it or double click on it for execution. Alternatively or in addition thereto, the device may be used to select a "custom transaction" menu option which causes a controller to display a list of predefined transactions to be displayed, in one or more columns, to enable one of the predefined transactions to be selected. Further, the list may extend for more than one page of the display and the device can be used to scroll up, down, left or right through the list and to select the desired transaction for execution. According to this embodiment, the point and click device is operatively connected to the terminal in a user accessible location. The movement of the pointing device by a user can then cause a cursor (or similar identifier) on the display to be moved to a desired position on the display to enable menu transaction items or parameters to be selected in a known manner.

The user-defined transactions may be stored on the ATM card upon activation of the ID card, added by a user or automatically stored based on the users recent transactions (e.g., by writing some or all of the transaction parameters to the ID card after a user manually enters a transaction and displaying this transaction as a menu choice the next time the user accesses the system). Alternatively, these transactions may be stored in a local memory of a terminal (e.g., a terminal of an ATM system) and be recalled when a user desires to execute a transaction. According to this embodiment, the transactions may be stored in a local memory of one or more terminals or in a central memory of the EFT system.

According to one embodiment, the transaction identifier and corresponding transaction information is stored on the ID card. Preferably, information corresponding to one or more transactions is stored. If desired, one card may be used to store information for more than one account for a single user. These multiple accounts may be with one or more institutions or entities with which the user is associated. Therefore, separate pluralities of user-defined transactions may be stored for separate accounts. For example, if a magnetic card is used, the transaction information for a particular account at a particular financial (or other) institution may be stored on one (or more) magnetic strip(s) on the ID card. Each transaction preferably is stored with a transaction identifier and all or most of the information necessary to complete a transaction. If a universal card is used, the user may be first prompted to select the account/institution with which a transaction is to be executed. Then, the custom transaction for that account/institution may be displayed (along with other choices as described herein).

The controller may be any generally known controller capable of use with an EFT system. It may be programmed to cause operation in the manner described herein.

The various inputs and selections described herein may be accomplished by the touch of a single key (or combination of keys) of the keypad, by touching a designated area of the display (e.g., if a touch sensitive screen is used), by touching a single input key adjacent to the transaction identified, by use of a "point-and-click" device associated with the terminal or by other input methods. In various circumstances, one or more of these types of input mechanisms may be advantageous over another.

The ID card, if used, may comprise a magnetic card, a bankbook with a magnetic storage member, an EEPROM card, a "smart card", an IC card or other suitable devices capable of storing the necessary information.

Preferably, one or more user-defined transactions stored on the ID card 30 are read by the card reader/writer 11 after the user inserts the card into the card reader/writer 11. The information may be read before and/or after the user enters verification data (e.g., a personal identification number or PIN). The stored information may be read once and stored in a local memory of the ATM terminal or read from the card 30 as and when needed, if the card is retained in the card reader writer 11 during use.

If the card reader retains the card during use, upon insertion of the card into the card reader or upon selection of the transaction identifier, the corresponding transaction information may be read from the card and used to execute the selected transaction. If a "dip" or "swipe" card reader is used, whereby the card is entered and withdrawn before selecting a transaction or passed through an external reader (i.e., it is not retained in the card reader during execution of a transaction), then the stored transaction information may be read and stored in a local memory of the terminal so that upon selection of a transaction identifier by the user, the corresponding transaction information may be read from the local memory and used to execute the selected transaction. If desired, this latter method may be used even if the card is retained in the reader during use.

Figure 3:
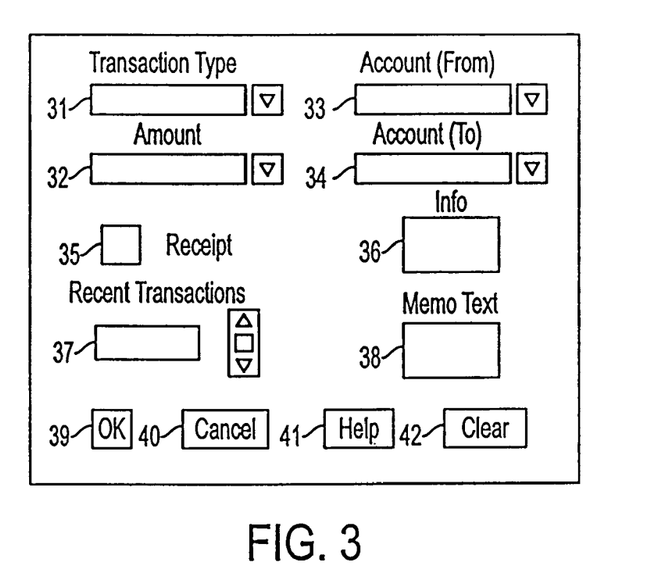
FIG. 3 is a schematic illustration of a graphical user interface according to one embodiment of the present invention.
Figure 3A:
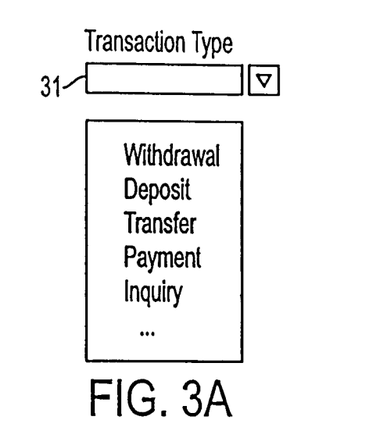
FIGS. 3A and 3B are schematic illustrations of a portion of a graphical user interface according to embodiments of the present invention.
Figure 3B:
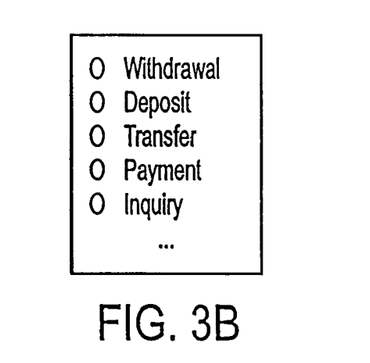

FIG. 3 schematically illustrates an example of a GUI for an ATM terminal 10 according to another embodiment of the present invention. Unlike conventional ATMs, which use a series of consecutive menu screens to enable the user to select the transaction type and transaction parameters, the GUI according to one embodiment of the present invention provides a single screen from which the user can select the transaction type and all or some of the transaction parameters necessary (or desired) to define the selected transaction. By way of example, the GUI shown in FIG. 3 is created using object-oriented programming tools. Other approaches may be used. As shown in FIG. 3, the GUI comprises a Transaction Type object 31 to enable the desired transaction type to be selected. As shown, the Transaction Type object 31 is a list box. However, other types of objects (such as a plurality of radio buttons) may be used. The Transaction Type list box 31 includes a space for showing the selected transaction type and a control for displaying and scrolling through the choices contained in the list. By pointing to and clicking on the down arrow control, a list of transaction types from which the user can select are displayed, as shown in FIG. 3A. Using the pointing device, the user can point to and select the transaction type desired. Upon doing this, the selected transaction type is displayed in the space of the Transaction Type list box 31. If a large number of transaction types are available, the user may scroll through the list using standard navigational techniques such as scroll bars, etc. If a plurality of radio buttons is used (FIG. 3B), the user can click on the radio button corresponding to the transaction type desired.

After selecting the desired transaction, the user selects transaction parameters to define the transaction. For example, if the selected transaction type was a Withdrawal, the user would specify the account from which the withdrawal is to be made, and the amount of the withdrawal. It may also be desired to specify whether a receipt should be printed upon execution of the transaction. An Account From object 33 is provided to enable selection of the desired account from which the Withdrawal is to be made. As shown, the Account From object 33 is a list box. However, other types of objects (such as a plurality of radio buttons) may be used. The Account From list box 33 includes a space for showing the selected account and a control for displaying and scrolling through the choices contained in the list. By pointing to and clicking on the control, a list of accounts from which the user can select are displayed (similar to that shown in FIG. 3A for the transaction types). Using the pointing device, the user can point to and select the account desired. If a large number of accounts are available, the user may scroll through the list using standard navigational techniques such as scroll bars, etc. If a plurality of radio buttons is used, the user can click on the radio button corresponding to the account desired. For transactions where more than one account is to be specified (e.g., a transfer), an Account To object 34 may also be used in a similar manner.

An Amount object 32 is provided to enable selection of the desired amount of the transaction. The Amount object 32 can be, for example, a text box or a combo-box. For example, a text box enables the user to enter "text" to identify the amount of the transaction. In this case, the text may be numbers entered via the keys of keypad 14, or by other mechanisms. A combo-box enables a user to input text or make choices from a list box. The combo-box includes a space for display of the selected amount and a control for displaying and scrolling through the choices contained in the list. By pointing to and clicking on the space the user can enter data (e.g., by using the keys of keypad 14) to enter the amount of the transaction. Alternatively, by pointing to and clicking on the control, a list of amounts may be displayed. Using the pointing device, the user can point to and select an amount desired if the desired amount is one listed. If a large number of amount choices are available, the user may scroll through the list using standard navigational techniques such as scroll bars, etc.

The GUI may also include a Receipt object 35 that enables the user to select whether a receipt should be printed upon completion of the transaction. The Receipt object 35 preferably is a check-box or a plurality of radio buttons, but other types of objects could be used. For example, if a check-box is used, the user may check or uncheck the box to indicate whether a receipt should be printed or not. If radio buttons are used, one of the radio buttons may have an associated label such as "Print Receipt" and another may have a label such as "No Receipt." By pointing to and clicking on one of the radio buttons, the user can select whether a receipt should be printed or whether no receipt should be printed upon completion of the transaction.

The foregoing are examples of some of the transaction parameters that may be necessary or desired to define a Withdrawal transaction and examples of types of objects that may be used to enable their selection. However, the invention is not limited to use of the types of objects exemplified above. Other types of objects or selection techniques may be used in carrying out the present invention. Moreover, other parameters could also be used if desired or necessary. For example, an Info object 36 in the form of a message box could be provided to display information to the user. For example, the Info box could automatically display information as to what the user should do next, or may display specific information if the user selects the Help button 41.

Additionally, a Recent Transactions object 37 may be provided to enable the user to cause a list of the user's recent transactions to be displayed. As shown, the Recent Transaction object 37 is a list box. However, other types of objects (such as a plurality of radio buttons) may be used. The Recent Transactions list box includes a space for showing the selected Recent Transaction and a control for displaying and scrolling through the recent transactions. By pointing to and clicking on the control, a list of Recent Transactions from which the user can select are displayed. Using the pointing device, for example, the user can point to and select the Recent Transaction desired. If a large number of Recent Transactions are available, the user may scroll through the list using standard navigational techniques such as scroll bars, etc. If a plurality of radio buttons is used, the user can click on the radio button corresponding to the Recent Transaction desired. The Recent Transactions feature may be used with the single screen display discussed above or it may be listed as one of the choices presented on the select Transaction Type menu of conventional ATMs. In this case, the menu may display transaction choices such as withdrawal, deposit, etc. and include a choice for Display Recent Transactions. If a Recent Transaction selection is made, the transaction type and transaction parameters for the selected transaction may be displayed in the respective objects (e.g., 31, 32, 33, 35, etc.) and the user may review the displayed data and select the OK button 39 to cause the transaction to be executed. If the transaction type or parameters are not as the user desires, the user can reselect the transaction or individually select the parameter(s) that need to be changed or just select the Clear button 42 which will clear the displayed data, but not cancel the transaction. Additionally, a Memo object 38 in the form of a text box can be provided as a memo field to enable a user to enter a note regarding the transaction. The memo can be printed on the transaction receipt if a receipt is to be printed. If this feature is used, it may be desired to provide an alpha-numeric keypad (not shown) to permit the desired text to be entered. Alternatively, or in addition, a plurality of pre-stored messages may be provided in a list box, from which the user can select one of the prestored messages. In this case, the Memo object 38 may be a combo-box that permits the user to enter text or to display and chose from a list of pre-stored messages. Other objects and/or transaction parameters could also be provided.

Once all of the transaction parameters have been selected, the user can use another object to cause the transaction to be executed. For example, the GUI preferably includes an OK button 39 and a Cancel button 40. Once the desired transaction type and transaction parameters have been selected, the user can point to and click on the OK button 39 to cause the transaction to be executed. If the user wants to cancel the transaction at any point, the user can point to and click on the Cancel button 40 to cancel the transaction. It may also be desired to provide a Clear button 42 to enable the user to clear any selections made, but not cancel the transaction. A Help button 41 may also be provided to provide on-line help to the user if necessary. According to one embodiment, the Help information may be displayed in an Info box 36. Alternatively, a separate help window or other techniques may be used. Once the user signals that the transaction should be executed (e.g., by clicking on OK), the selected transaction type and transaction parameters are provided to the local controller and the controller uses these parameters to execute the transaction. The operation of the controller in an ATM is generally well known. For simplicity, it will not be repeated here.

In some cases, it may be desired to "gray-out" an object or otherwise render it inactive in situations where the user should not use the object (e.g. if it is not applicable). In some cases, additional choices may be applicable and can be added to the screen when appropriate or be made available on another screen.

While the foregoing embodiments have been described in connection with the use of a pointing device and object-oriented tools, other input/selection techniques could be used. Without limitation, for example, a touch screen display could also be used. According to this embodiment, a portion of the display is provided for each of the transaction type and transaction parameters. The user then touches the appropriate portion of the display corresponding to each of the desired choices for the transaction type and the transaction parameters. In this way, all or most of the selections that a user must make to execute a transaction can be displayed on a single screen. Thus, the user can select the parameters in any order, can view all of the selections and can individually change a previously selected parameter if it is incorrect or if the user changes its mind. Other advantages also exist.

Figure 4:
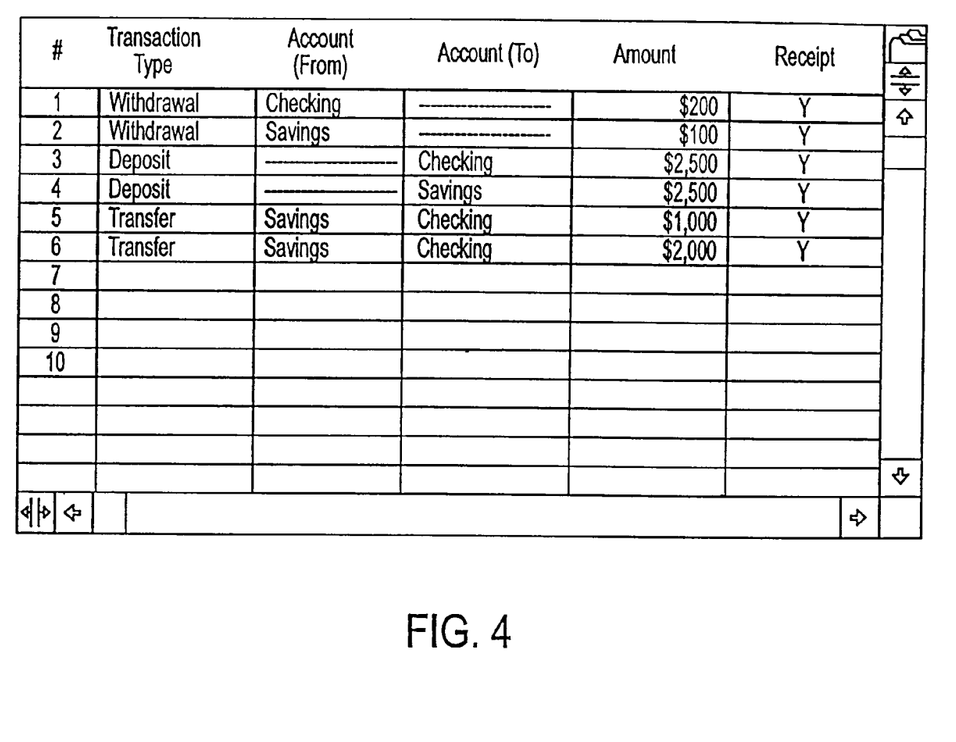
FIG. 4 is a schematic illustration of a graphical user interface for an ATM system according to one embodiment of the present invention.

FIG. 4 schematically illustrates an example of a GUI for an ATM terminal 10 according to another embodiment of the present invention. According to this embodiment, the GUI comprises a table from which the user can select a transaction. Preferably, according to this embodiment, the display 15 displays a table comprising a plurality of rows and columns, where the rows and columns contain a listing of the transaction types and transaction parameters. For example, a first column may contain a listing of transaction identifiers (e.g. 1, 2, 3 . . . , etc.). A second column may contain a listing of transaction types. Third and fourth columns may contain a listing of accounts (e.g., From and To accounts). A fifth column may contain a listing of amounts and a sixth column may contain an indication of whether or not a receipt should be printed. Other types of information may also be displayed and the order of the rows and columns is not necessarily critical. Any logical order may be used. If the displayed transactions include the transaction that the user desires, the user may select the transaction in one of several ways. For example, the user may use the key pad 14 to enter the transaction identifier (#) associated with the desired transaction. Alternatively, a pointing device may be used to point to and click on the desired transaction. If a touch screen is used, the user can touch the desired transaction. Other selection techniques may also be used.

According to another embodiment of the invention, an ATM system and method are provided where the ATM includes a display that provides a single screen from which the user can select the transaction type and the transaction parameters necessary (or desired) to define the selected transaction as in FIGS. 3 or 4. However, according to this embodiment, the ATM may predict and preselect a transaction type and transaction parameters for that transaction. If the selections are as the user desires them to be, then the user can simply select the OK button 39 to cause the transaction to be executed. This greatly reduces the number of selections that a user must make to execute a transaction using an ATM. If the preselected transaction type is the desired transaction type, but one or more of the transaction parameters is not as the user desires, the user can re-select the transaction parameter(s) that are not as desired. This also can reduce the number of selections that a user must make to execute a transaction using an ATM. If the preselected transaction type is not the transaction type that the user desires, the user can re-select the transaction type by pointing to the Transaction Type object and selecting the desired transaction type. Upon selection of the desired transaction type, the ATM may then predict and preselect transaction parameters for that selected transaction type. If these preselected transaction parameters are not as the user desires, the user may re-select the transaction parameter(s) as discussed above. This too can reduce the number of selections that a user must make to execute a transaction using an ATM.

The predictions and pre-selections made by the ATM may be made in a number of different ways. In general, however, it is preferable for the ATM to try to predict a transaction type and transaction parameters that the user is likely to want to use to execute a transaction. One way to do this is to store information regarding one or more of the user's past transactions or for the user to store a plurality of user-defined transactions, and to read this stored information when a user accesses an ATM (or other type of EFT system). For example, the information may be stored on the user's ATM card (e.g., a magnetic storage card). Then, when the ATM card is read by the card reader (e.g., card reader 13 of FIG. 1), the stored information may be read and used to predict a desired transaction type. If a user often repeats the same transaction there is a good chance that the preselected transaction type will be the transaction type that the user will want. If this is the case, the number of selections that the user must make to execute the transaction can be reduced. In an ideal case, the ATM will correctly preselect the transaction type and the transaction parameters and all the user needs to do is to select the OK button to cause the transaction to be executed. However, even if this is not the case, the number of selections that the user must make at the time of execution of a transaction can still be less than if the user must select the transaction type on each of the transaction parameters every time the user wants to execute a transaction.

Many methodologies may be used to preselect the transaction. Several examples are provided below, but the invention is not so limited. One way to preselect the transaction and transaction parameters is to store the user's last transaction on the user's ATM card and to cause this information to be read when the user enters the card into the card reader of the ATM. Then, the ATM uses this information to preselect the transaction type and transaction parameters displayed on the GUI. According to another embodiment, a plurality of transactions is stored on the user's card. For example, the transactions may be pre-stored by the user in a manner described above or the transactions may be recent transactions that have been executed by the user and stored (e.g., on the user's card). In either case, one of the stored transactions may be selected by the ATM as the predicted transaction. This selection may involve selecting the stored transaction most often requested by the user. To facilitate this, each time a stored transaction is executed by the user, a counter may be incremented to track the number of times the transaction is executed by the user. One way to do this is to store a look-up table which lists each transaction (or an associated identifier) and the number of times the transaction is executed. As an additional enhancement, one or more of the date, day of the week, time, location or other factors relating to each execution of a transaction by the user is also stored in the table. In this way, other methods for preselecting and predicting a transaction may be used. For example, these methods may involve looking at the current day of the week and determining the most common transaction that the user performs on that day. For example, a particular user may often withdraw money from an ATM on Mondays and deposit a paycheck on Fridays. By storing the date of each execution along with the number of times that each transaction is executed, the transaction that has been executed the most during a predetermined time period may be predicted. Additionally, the user may often perform a particular type of transaction at a given location. By storing the location of each executed transaction, this criteria may be used to predict a transaction. Other predictive techniques or combinations of these and other techniques may also be used to predict the type of transaction that the user may want to execute. Various techniques may involve looking at a number of criteria, with relative weighting assigned to each criteria to assign a score to each transaction to predict the one the user will likely want to execute. Various types of artificial intelligence (e.g., neural network type techniques) may be used to refine the predictive ability of the ATM over time.

Similarly, for a selected transaction type, the various transaction parameters that the user may desire may be predicted based on stored information. For example, a user may routinely make withdrawals in a certain amount and from a particular account. Thus, if the ATM predicts that the user may want to withdraw funds, stored historical data regarding the Account and Amount may be preselected. Alternatively, if the user selects Withdrawal as the transaction type, the ATM may, in response to this selection, predict and preselect these transaction parameters. Thus, the ATM may initially predict an entire transaction (including transaction type and transaction parameters) or only part of the transaction (e.g., the transaction type or one or more transaction parameters).

According to another aspect of the present invention, the ATM system may predict one or more of the transaction parameters globally for all transaction types. For example, based on stored information, the ATM may determine that a user always or usually selects that a receipt should or should not be printed. If this is the case, the ATM may always predict and preselect that the user will want a receipt to be printed. Other global selections and methodology may also be used.

Figure 5:
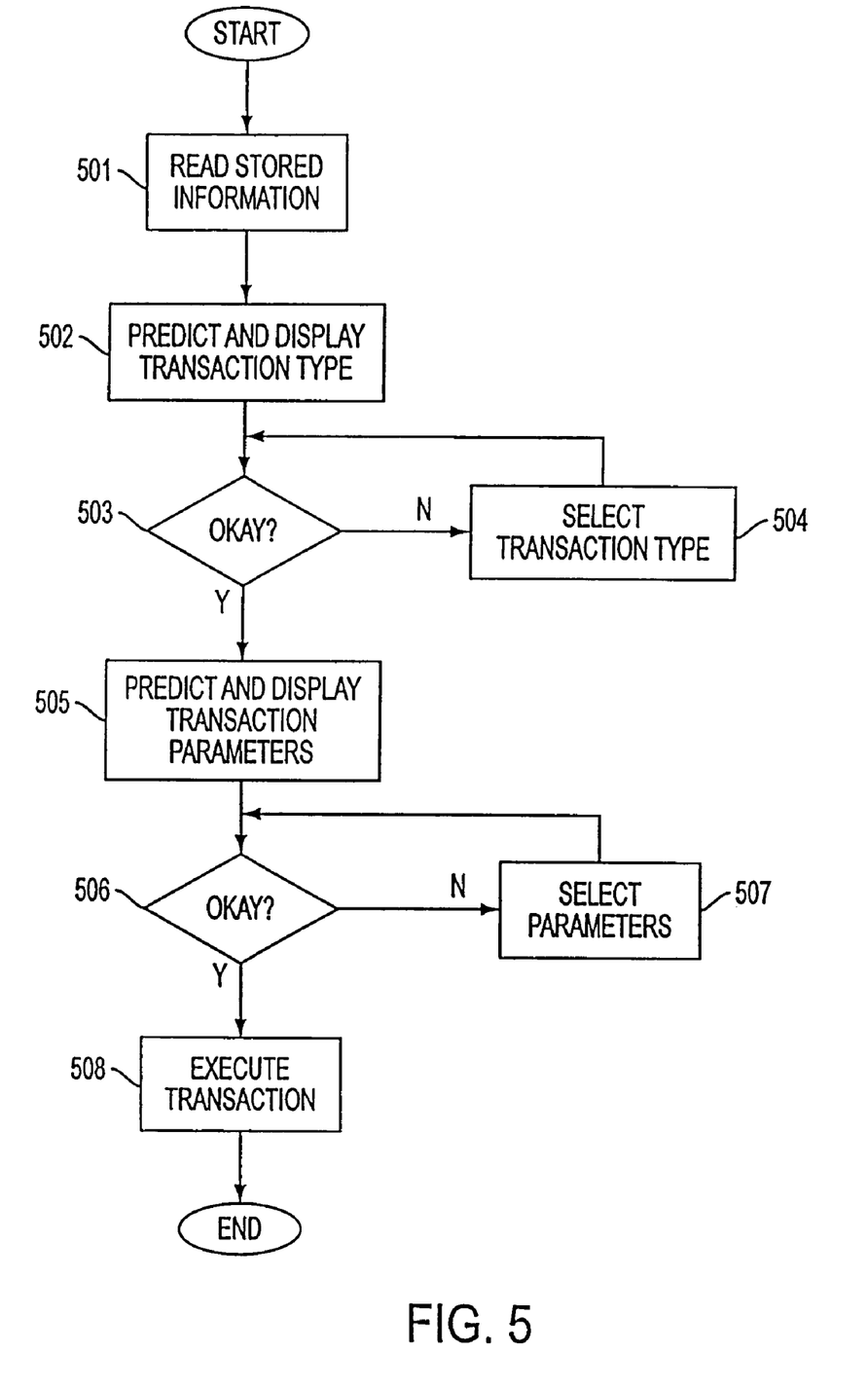
FIG. 5 is an example of a flow chart illustrating the operation of certain aspects of an ATM system according to one embodiment of the present invention.

An example of a flow chart according to one embodiment of this aspect of the invention is provided in FIG. 5. As shown in FIG. 5, when a user desires to execute a transaction, standard preliminary steps are performed (not shown) and then the stored information is read (Step 501). For example, if transaction information is stored on a magnetic card, the user inserts the card into a card reader associated with the ATM and the stored information is read. Next, the ATM predicts and displays the transaction type that the user may want to execute (Step 502). The prediction may be made according to one of the techniques described above or in some other manner. The predicted transaction type is also displayed (e.g., in Transaction Type object 31). In Step 503, the user is prompted to indicate whether this is the desired transaction type. If predicted transaction type is the transaction type desired by the user, the user indicates OK. If not, the user selects the desired transaction type (Step 504) and selects OK. From Step 503, control passes to Step 505. In Step 505, the ATM predicts the transaction parameters for the selected transaction type. If the predicted transaction parameters are as the user desires, the user selects OK (Step 506). If one or more of the predicted transaction parameters is not as the user desires, the user may select the parameter(s) (Step 507) and then select OK (Step 506). From Step 506, control passes to Step 508 and the transaction is executed. Other steps (not shown in FIG. 5) may be performed prior to or after execution of the transaction.

Figure 6:
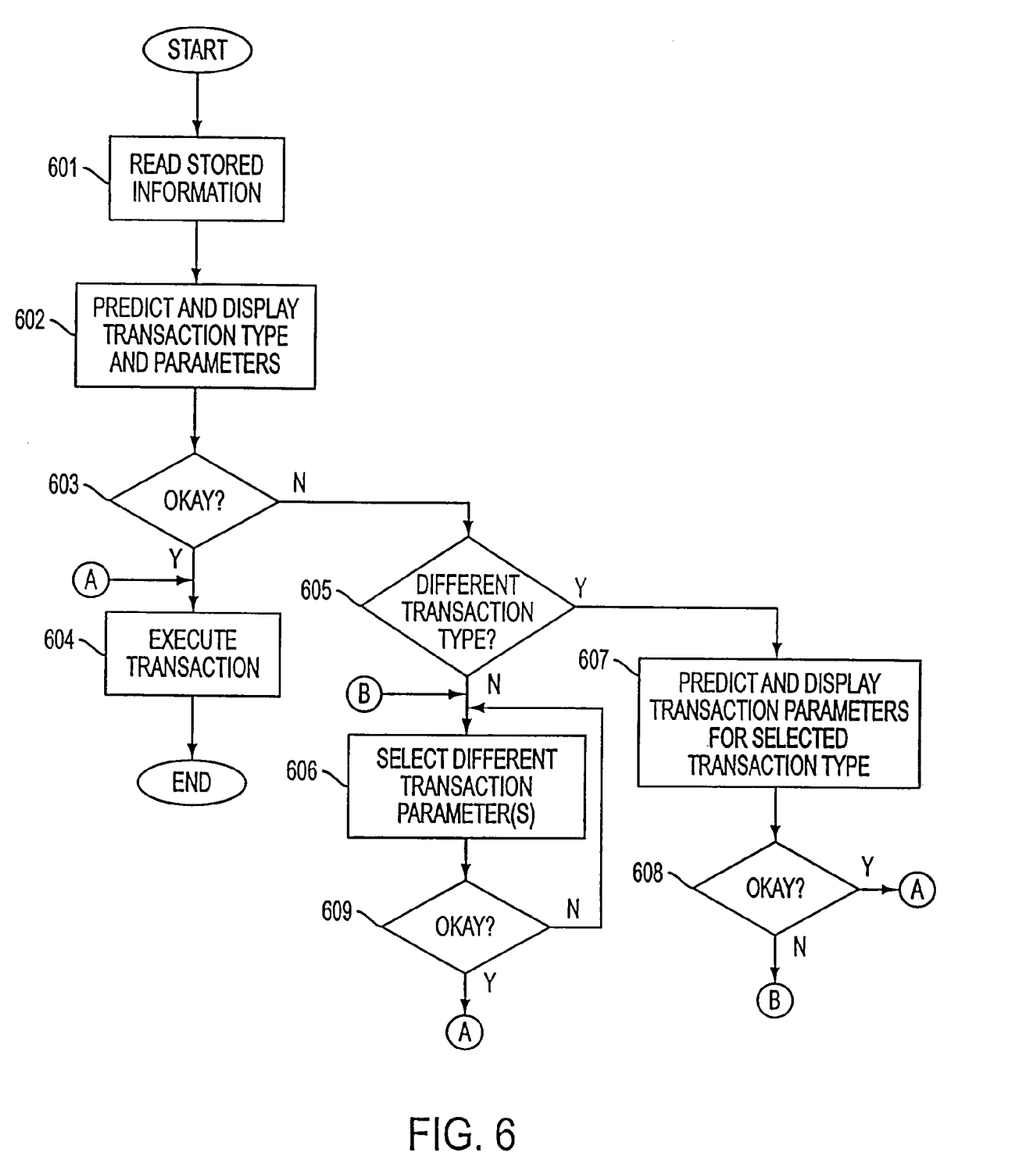
FIG. 6 is an example of a flow chart illustrating the operation of certain aspects of an ATM system according to one embodiment of the present invention.

According to another embodiment of the invention, as shown in FIG. 6, stored information may be read (e.g., from the user's magnetic card) (Step 601). Then, the ATM predicts and displays a transaction type and transaction parameters (Step 602). At this point the user may be prompted to select OK if all selections are as desired or the user may select a different transaction type (Step 605) or transaction parameter(s) (Step 606) and then select OK (Step 609). If the predicted transaction type and the transaction parameters displayed in Step 602 are as the user desires, the user selects OK (Step 603) and control passes to Step 604. If the user selects a different transaction type (Step 605), the ATM may make a new prediction of the transaction parameters for the selected transaction type (Step 607). If the predicted transaction type is as the user desires (i.e the user does not select a different transaction type in Step 605), the user may change one or one or more transaction parameters (Step 606) and then select OK (Step 609). Returning to Step 607, if the ATM predicts and displays transaction parameters for the newly selected transaction type, and the parameters are as the user desires, then the user may then select OK (Step 608) and control passes to Step 604. If not, control passes to Step 606. In Step 604, the selected transaction is executed. Other steps (not shown in FIG. 6) may be performed prior to or after execution of the transaction.

While many of the foregoing examples illustrate the operation of various aspects of the invention in connection with a withdrawal, other transaction types can also be performed in accordance with the present invention.

The foregoing is a description of various aspects of the preferred embodiments and features of the present invention. However, the invention is not so limited. Various other alternatives consistent with the invention will be apparent to one of ordinary skill in the art. The scope of the invention is only limited by the claims appended hereto.

The invention claimed is:

1. A system for automatically providing customer preferences during a fueling operation, the system comprising:
   a fuel dispenser with an audio/visual customer interface having a display and audio system;
   wireless communication electronics associated with said fuel dispenser and adapted to receive signals including indicia from remote communication units; and
   a control system and memory associated with said communication electronics and said customer interface;
   said control system adapted to receive the indicia from a remote communication unit and provide a customer with select information predefined by the customer at said customer interface, said select information being selected by the customer and associated with the remote communication unit prior to the transaction.

2. The system of claim 1 wherein said memory is located apart from said fuel dispenser and is operatively associated with a central site control system.

3. The system of claim 1 wherein said control system includes a dispenser control system located in said fuel dispenser.

4. The system of claim 3 wherein said control system further includes a central site control system located apart from said fuel dispenser.

5. The system of claim 1 wherein said control system includes a central site control system located apart from said fuel dispenser.

6. The system of claim 1 wherein the indicia includes identification indicia and said select information is stored in said memory in association with the identification indicia of the remote communication unit and said control system is adapted to access said select information in said memory upon receipt of the identification indicia and provide the select information at the customer interface.

7. The system of claim 1 wherein said control system is adapted to access said select information at a remote network based on the indicia and provide the select information at the customer interface upon receipt of the indicia and accessing said select information.

8. The system of claim 1 wherein the indicia defines the select information stored in said memory, said control system adapted to access said select information using the indicia after receipt of the indicia and provide the select information at the customer interface.

9. The system of claim 1 wherein the indicia includes the select information and said control system is adapted to receive said select information through the communication electronics and provide the select information at the customer interface.

10. The system of claim 1 wherein the selected information is stored on an audio/visual source adapted for playback of audio/visual material and said control system is adapted to control the audio/visual source to play the audio/visual material at said customer interface.

11. The system of claim 1 wherein said select information includes audio and visual components.

12. The system of claim 1 wherein said select information includes a desired greeting to be provided at the customer interface to the customer.

13. The system of claim 12 wherein said greeting is audibly presented to the customer.

14. The system of claim 12 wherein said greeting is visually displayed to the customer.

15. The system of claim 1 wherein said control system is adapted to allow a customer to modify the predefined selected information during a transaction to receive additional selected information.

16. The system of claim 15 wherein said control system stores the additional selected information as said selected information for future transactions.

17. The system of claim 16 wherein said control system and said communications system are adapted to transmit information to the remote communications unit to store the additional information as the selected information.

18. The system of claim 1 wherein the wireless communication electronics comprises a magnetic card reader/writer and the remote communication units comprise magnetic cards.

19. A system for automatically preventing presentment of information based on customer preferences during a fueling operation, the system comprising:
- a fuel dispenser with a customer interface adapted to present information to a customer during a transaction;
- wireless communication electronics associated with said fuel dispenser and adapted to receive signals including indicia from remote communication units; and
- a control system and memory associated with said communication electronics and said customer interface;
- said control system adapted to present said select information at said customer interface;
- said control system adapted to receive the indicia from a remote communication unit and prevent presentment of select information at said customer interface, said select information being selected by the customer and associated with the remote communication unit prior to the transaction.

20. The system of claim 19 wherein the indicia is identification indicia and said select information is stored in association with the identification indicia of the remote communication unit and said control system is adapted to identify said select information upon receipt of the identification indicia and prevent the presentment of the select information accordingly.

21. The system of claim 19 wherein the predefined parameters are transmitted to the communication electronics from said remote communication unit and said control system is adapted to receive the predefined parameters and control the transaction accordingly.

22. An interrogation system associated with a fuel dispensing system for automatically providing customer preferences during a fueling operation, said system comprising:
- a customer transaction interface associated with an interrogator for communicating with transponders; and
- a control system and memory associated with said interrogator;
- said control system adapted to interrogate a remote communication unit with said interrogator during a transaction and provide select types of information predefined by the customer at said customer interface, said select types of information being selected by the customer and associated with the remote communication unit prior to the transaction.

23. The system of claim 22 wherein said interrogator is adapted to interrogate the transponder and receive identification indicia, and provide such information to said control system.

24. The system of claim 22 wherein said interrogator is adapted to interrogate the transponder and receive indicia including the select types of information predefined by the customer, said control system using the indicia to determine the select types of information predefined by the customer, access the information and provide the information to the customer.

25. A method for automatically providing customer preferences during a fueling operation, the method comprising:
- receiving indicia from a remote communication unit in association with a fueling transaction;
- determining select types of information predefined by the customer using the indicia received from the remote communication unit, the select types of information being selected by the customer and associated with the remote communication unit prior to the fueling transaction;
- accessing information defined by the select types of information; and
- providing the information to the customer during a transaction.

26. The method of claim 25 wherein the receiving includes receiving identification indicia for the remote communication unit and the accessing includes accessing information according to the select types of information in a database using the identification indicia.

27. The method of claim 25 wherein the indicia includes the select types of information.

\* \* \* \* \*